United States Patent [19]

Shimizu et al.

[11] 4,083,822

[45] Apr. 11, 1978

[54] PROCESS FOR PRODUCING A POLYMER EMULSION

[75] Inventors: Akihiko Shimizu; Takao Hayashi, both of Shin-nanyo, Japan

[73] Assignee: Toyo Soda Manufacturing Co., Ltd., Japan

[21] Appl. No.: 690,907

[22] Filed: May 28, 1976

[30] Foreign Application Priority Data

Jun. 12, 1975 Japan .................................. 50-70165

[51] Int. Cl.$^2$ .............................................. C08L 11/02
[52] U.S. Cl. ...................... 260/29.6 HN; 260/29.7 H; 260/29.7 T
[58] Field of Search ................. 260/29.6 HN, 29.7 H, 260/29.7 T

[56] References Cited

U.S. PATENT DOCUMENTS

| | | | |
|---|---|---|---|
| 3,751,451 | 8/1973 | Samour et al. | 260/29.6 HN |
| 3,780,092 | 12/1973 | Samour et al. | 260/29.6 HN |
| 3,873,488 | 3/1975 | Gibbs et al. | 260/29.7 H |
| 3,926,890 | 12/1975 | Huang et al. | 260/29.7 H |

*Primary Examiner*—M. J. Welsh
*Attorney, Agent, or Firm*—Oblon, Fisher, Spivak, McClelland & Maier

[57] ABSTRACT

A polymer emulsion is produced by reacting a vinyl monomer having an active halogen with a higher amine in a monomer having ethylenically unsaturated double bond and then conducting a free radical polymerization with the addition of water.

10 Claims, No Drawings

PROCESS FOR PRODUCING A POLYMER EMULSION

BACKGROUND OF THE INVENTION

1. Field of the Invention

The present invention relates to a process for producing a cationic polymer emulsion. More particularly, it relates to a process for producing a cationic polymer emulsion which has both mechanical and chemical stability without the use of conventional emulsifiers.

2. Description of the Prior Art

In the manufacture of synthetic rubbers, synthetic resins and paints, aqueous emulsion polymerization using an emulsifier has been employed to produce the polymer. However, emulsifiers discharged in process waste waters are a source of water pollution. In preparing adhesive agents, the use of solvents has been limited because they are a source of air pollution. Also, it is often difficult to use the conventional solvent-type adhesive, and it is preferable to use an emulsion-type adhesive instead.

In emulsions produced by the conventional emulsion polymerization using an emulsifier and in polymers separated from such emulsions, emulsifier remains and interferes with subsequent use of the product. For example, the retained emulsifier causes the adhesion of the polymer onto mixing rolls and molds. It is also known that the retained emulsifier causes separation of the phases of adhesive compositions and reduces the adhesive property of the emulsion.

It has been theorized that these difficulties result from the separation of the emulsifier from the polymer particles under certain conditions because the emulsifier is physically adsorbed on the surface of the polymer particles in the emulsion. In order to overcome these difficulties, it has been proposed to produce an emulsion by using an unsaturated acid or a reactive emulsifier without using conventional emulsifiers in the case of an anionic emulsion. (Japanese Unexamined Patent Publications Nos. 34588/1974 and 40388/1974). However, no known technique exists for preparing a cationic emulsion.

Accordingly, there exists a need for a process capable of preparing cationic polymer emulsions without the use of conventional emulsifiers.

SUMMARY OF THE INVENTION

It is an object of the present invention to provide a process for preparing a cationic polymer emulsion having both mechanical and chemical stability without using a conventional cationic emulsifier. Polymer emulsion means aqueous emulsions of a homopolymer or copolymer of a monomer having an ethylenically unsaturated double bond. This and other objects of the invention have been attained by producing a cationic polymer emulsion by reacting 0.1 to 10 wt. parts of a vinyl monomer having an active halogen with 0.1 to 10 wt. parts of a higher amine in 100 wt. parts of a monomer having an ethylenically unsaturated double bond, and then conducting a free radical polymerization with the addition of water.

DETAILED DESCRIPTION OF THE PREFERRED EMBODIMENTS

The reaction of the vinyl monomer having an active halogen with the higher amine in the process of this invention produces a reactive cationic emulsifier having a cationic terminal and a double bond. Typical vinyl monomers having an active halogen include allyl halides such as allyl chloride, methallyl chloride, allyl bromide, allyl iodide, etc.; chloromethyl styrene derivatives such as p-chloromethyl styrene, m-chloromethyl styrene, etc.; acid halides such as acrylic acid chloride, methacrylic acid chloride, etc. and are used in a range of from 0.1 to 10 wt. parts, preferably 1 to 4 wt. parts per 100 wt. parts of the monomer having an ethylenically unsaturated double bond.

The higher amines are primary, secondary or tertiary amines having the formula:

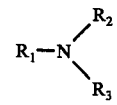

wherein $R_1$ represents a $C_{6-22}$ alkyl group, preferably a $C_{8-18}$ alkyl group and $R_2$ and $R_3$, respectively, represent, hydrogen or methyl. Typical higher amines include octylamine, dodecylamine, coconutalkylamine, tetradecylamine, octadecylamine, dodecyldimethylamine, coconutalkyldimethylamine, tetradecyldimethylamine, hexadecyldimethylamine, dodecylmethylamine, etc.; and are added in the range of from 0.1 to 10 wt. parts, preferably 1 to 4 wt. parts per 100 wt. parts of the ethylenically unsaturated monomer.

As is well known, the higher amine is water insoluble and has no emulsifying properties, but an emulsifying property is imparted by reacting the higher amine with the vinyl monomer having an active halogen. It is preferable to conduct the reaction in a monomer having an ethylenically unsaturated double bond such as chloroprene, butadiene, styrene, methyl methacrylate, vinyl chloride, vinyl acetate, etc. It is possible to react them in a solvent such as benezene, toluene, methanol, ethanol, etc. However, in order to increase the amount of polymer in the emulsion, it is preferable to react them in a monomer which can be polymerized under free radical polymerization conditions. When the vinyl monomer having active halogen is heated in water, the halogen terminal group is easily converted to a hydroxy terminal group. Accordingly, it is not preferred to add water just after mixing it with the higher amine. It is preferable to add the water after the vinyl monomer has been mixed with the higher amine at 20° to 100° C, preferably 30° to 60° C, by stirring for more than 15 minutes. The mixing time is preferably longer, such as 4 or 5 hours though shorter times may be sufficient, i.e., 60 minutes.

A stable emulsion can be obtained by polymerizing the mixture by the addition of a free radical polymerization initiator after adding the water. It is preferable to add a small amount of an acid such as hydrochloric acid, sulfuric acid, acetic acid, etc. in order to improve the stability of the emulsion, though this is not essential. It is also possible to add a small amount of a conventional cationic emulsifier. Typical emulsifiers include dodecyltrimethyl ammonium chloride, coconutalkyltrimethyl ammonium chloride, coconutalkyldimethylbenzyl ammonium chloride, dodecyl pyridinum chloride, etc.

Typical monomers having an ethylenically unsaturated double bond which are used in this invention include dienes such as 1-chlorobutadiene, 2, 3-dichlorobutadiene, 2-cyanobutadiene, isoprene, chloroprene, etc. and ethylene, styrene, vinyl chloride, vinyl acetate, vinyl pyridine, acrylonitrile, acrylates and methacrylates, and mixtures thereof.

Typical initiators used in the process of this invention include mixtures of hydroperoxide and amines or other redox-type catalysts, however, 2.2'-azobisisobutylamidine hydrochloride having a cationic terminal group is especially preferred.

It is possible to use the conventional molecular weight modifiers which have been used in emulsion polymerization. Typical molecular weight modifiers include alkylmercaptanes, alkylxanthogendisulfides and halohydrocarbons. It is also possible to add a polyfunctional monomer, such as divinylbenzene, glycidylmethacrylate, etc., in order to form a gel. The amount of the additives is selected as desired to control molecular weight and gelation.

The polymerization can be conducted at 0° to 100° C, preferably 10° to 80° C. The pH of the polymerization system can be in the broad range of acidic to alkaline pH, but is preferably from neutral to acidic pH. The polymerization can be stopped by adding a conventional polymerization inhibitor, such as hydroquinone t-butyl catechol, phenothiazine etc. When unreacted monomer remains, it can be removed by treating the polymerization mixture at elevated temperatures under reduced pressure.

Having generally described the invention, a more complete understanding can be obtained by reference to certain specific examples, which are provided herein for purposes of illustration only and are not intended to be limiting unless otherwise specified.

In the examples the term of "part" designates "part by weight" unless otherwise defined.

EXAMPLES 1 to 4 COMPARISON EXAMPLE 1

Polymerization was conducted in a four necked flask equipped with a stirrer, a condenser, and a temperature detector, under a nitrogen atmosphere. 100 parts of chloroprene, 2 parts of allyl chloride and 3 parts of coconutalkyldimethylamine were mixed with stirring in a nitrogen gas flow under the conditions shown in Table 1. Then, 130 parts of water was added to the mixture. When the temperature reached 40° C, 0.5 part of azobisisobutylamidinum hydrochloride (AIBA) was added to initiate the polymerization. After the initiation of polymerization, the formation of an emulsion began. When the conversion reached 70%, an aqueous solution of hydroquinone was added to stop the polymerization. After the addition of the polymerization inhibitor, the unreacted chloroprene was recovered under a reduced pressure to obtain an emulsion of chloroprene rubber. The results are shown in Table 1.

TABLE 1

| Example Number | Temperature For Mixing (° C) | Time For Mixing (min.) | Time For Polymerization (min.) | Note |
|---|---|---|---|---|
| 1 | 40 | 30 | 345 | white latex |
| 2 | 40 | 60 | 240 | white latex |
| 3 | 50 | 75 | 180 | white latex |
| 4 | 40 | 180 | 150 | white latex |
| Comparison 1 | 50 | 0 | 360 | no emulsion |

During the polymerization, an increase in the viscosity of the polymerization system did not occur. The resulting emulsion was stable. Even though an alcohol e.g. methanol, ethanol was added to the emulsion, no aggregate was formed which is indicative of high chemical stability.

EXAMPLES 5 TO 10

In the apparatus of Example 1, the vinyl monomer having active halogen and the higher amine shown in Table 2 were added to 100 parts of chloroprene. The mixture was stirred at 40° C for 60 minutes, then 100 parts of water and 0.1 part of AIBA were added to polymerize the chloroprene at 40° C until reaching 70% polymerization conversion. The unreacted chloroprene was recovered in accordance with the process of Example 1. The resulting emulsion had high chemical stability as that of Example 1 and the surface tension of the emulsion was satisfactorily low so that the emulsion was stable. The results are shown in Table 2.

TABLE 2

| Ex. Number | Monomer Having Active Halogen (part) | Higher Amine (part) | Time For Polymerization (min.) | Surface Tension (d/cm)[a] |
|---|---|---|---|---|
| 5 | chloromethyl styrene (3.0) | coconutalkyl dimethyl amine (4.0) | 195 | 30.3 |
| 6 | acrylic acid chloride (2.0) | coconutalkyl dimethyl amine (2.7) | 275 | 38.1 |
| 7 | allyl chloride (4.0) | n-dodecyl amine (2.6) | 270 | 35.3 |
| 8 | allyl chloride (2.0) | dodecyl dimethylamine (3.0) | 150 | 40.3 |
| 9 | allyl chloride (2.0) | hexadecyl dimethylamine (2.0) | 180 | 34.6 |
| 10 | chloromethyl styrene (3.0) | n-octyl amine (4.0) | 315 | 34.7 |

Note: [a]The surface tension of the emulsion was measured by Wilhemly method.

EXAMPLE 11

In the process of Example 8, 0.5 part of acetic acid was added together with water and the polymerization was then conducted. The emulsion was initiated at the time of the addition, and the polymerization rate was such that 75% conversion was attained in 120 minutes. The polymerization stability was high and the surface tension of emulsion was satisfactorily low, 30.3 d/cm, so that the emulsion was quite stable.

EXAMPLE 12

In the process of Example 8, 100 parts of styrene was used instead of 100 parts of chloroprene and 2.0 parts of allyl chloride and 3.0 parts of dodecyldimethylamine were mixed at 40° C for 60 minutes with stirring in the styrene. Then, 100 parts of water was added in a nitrogen gas flow, the temperature of the polymerization system was raised to 70° C and the polymerization was conducted in accordance with the process of Example 8. The conversion reached 100% after 4 hours. The resulting emulsion had chemical stability as that of Example 1 and a satisfactorily low surface tension of 34.2 d/cm.

EXAMPLE 13

In the process of Example 5, 100 parts of methyl methacrylate was used instead of 100 parts of chloroprene, and 3.0 parts of chloromethyl styrene and 4.0 parts of coconutalkyldimethylamine were mixed at 40° C for 60 minutes with stirring in the methylmethacrylate. The polymerization was conducted in accordance with the process of Example 5. The polymerization conversion reached 100% after 5 hours. The resulting emulsion had a satisfactorily low surface tension of 35.3 d/cm and high chemical stability.

EXAMPLE 14

In the process of Example 6, 100 parts of vinyl acetate was used instead of 100 parts of chloroprene, and 2.0 parts of acrylic acid chloride and 2.7 parts of coconutalkyldimethylamine were mixed at 40° C for 60 minutes with stirring in said vinylacetate. 100 parts of water was added in a nitrogen gas flow, the polymerization system was heated to 70° C and the polymerization was conducted for 4 hours, to obtain an emulsion having a solid content of 43%. The surface tension of the emulsion was 36.6 d/cm.

EXAMPLE 15

A stainless steel autoclave equipped with an electromagnetic stirrer and a pressure gauge was purged with nitrogen gas and was kept under reduced pressure. 2.0 parts of allyl chloride, 3.0 parts of dodecyldimethylamine, 0.3 part of n-dodecylmercaptan and 100 parts of butadiene were charged into the autoclave and were mixed at 40° C for 60 minutes with stirring. After the reaction, the autoclave was cooled and 130 parts of water was added. The temperature in the autoclave was then raised to 50° C and 1.0 part of azobisisobutylamidinum hydrochloride was added. After polymerizing for 3 hours, the conversion was 64%. The emulsion had satisfactorily low surface tension of 35.5 d/cm and high chemical stability.

EXAMPLE 16

In the process of Example 8, a mixture of 90 parts of chloroprene and 10 parts of 2,3-dichlorobutadiene-1,3 was used instead of 100 parts of chloroprene, and 2.0 parts of allyl chloride and 3.0 parts of dodecyldimethylamine were mixed at 40° C for 60 minutes with stirring in said mixture. 100 parts of water was added and the polymerization was conducted in accordance with the process of Example 8 to obtain an emulsion having a low surface tension of 33.4 d/cm and high chemical stability as that of Example 1.

EXAMPLE 17

In the process of Example 5, a mixture of 90 parts of chloroprene and 10 parts of styrene was used instead of 100 parts of chloroprene, and 3.0 parts of chloromethyl styrene and 4.0 parts of coconutalkyldimethylamine were mixed at 40° C for 60 minutes with stirring in said mixture. The polymerization was conducted in accordance with the process of Example 5 to obtain an emulsion having a low surface tension of 32.6 d/cm and high chemical stability as that of Example 1.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A process for producing a cationic polymer emulsion consisting essentially of the steps:
    (A) mixing 0.1 to 10 wt. parts of a vinyl monomer having an active halogen with from 0.1 to 10 wt. parts of a higher amine in 100 wt. parts of a monomer having an ethylenically unsaturated double bond;
    (B) subsequently adding water to the resulting mixture; and
    (C) conducting a free radical polymerization wherein the sole monomers polymerized are said monomer having an ethylenically unsaturated double bond and the reaction product of said higher amine and said vinyl monomer having an active halogen.

2. The process of claim 1, wherein the higher amine is a primary, secondary or tertiary amine having the formula

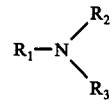

wherein $R_1$ represents an alkyl group having 6–22 carbon atoms and $R_2$ and $R_3$ respectively represent hydrogen or methyl.

3. The process of claim 1, wherein the vinyl monomer having an active halogen is selected from allyl halides, chloromethyl styrene derivatives and acid halides.

4. The process of claim 1, wherein the monomer having an ethylenically unsaturated double bond is selected from 1-chlorobutadiene, 2,2-dichlorobutadiene, 2-cyanobutadiene, isoprene, chloroprene, ethylene, styrene, vinyl chloride, vinyl acetate, vinyl pyridine, acrylonitrile, acrylates, methacrylates and mixtures thereof.

5. The process of claim 1, wherein a small amount of a conventional cationic emulsifier is added to emulsify the monomer.

6. The process of claim 1, wherein a molecular weight modifier or a polyfunctional monomer is added to control the molecular weight and gelation of polymer.

7. The process of claim 1, wherein an acid is added when the water is added.

8. The process of claim 2, wherein $R_1$ represents an alkyl group having 8 to 18 carbon atoms.

9. The process of claim 1 wherein said monomer having an ethylenically unsaturated double bond comprises a mixture of chloroprene and 2,3-dichlorobutadiene-1,3.

10. The process of claim 1 wherein said monomer having an ethylenically unsaturated double bond comprises a mixture of chloroprene and styrene.

* * * * *